(12) United States Patent
Hoffmann et al.

(10) Patent No.: US 10,215,324 B2
(45) Date of Patent: Feb. 26, 2019

(54) METHOD OF AND SYSTEM FOR COATING A FIELD JOINT OF A PIPE

(71) Applicant: Subsea 7 Limited, Sutton (GB)

(72) Inventors: Philippe Benoit Jacques Hoffmann, Rousset-les-Vignes (FR); Mike Gordon, Godalming (GB); Nicolas Monfort-Moros, London (GB); Sylvain Popineau, London (GB)

(73) Assignee: Subsea 7 Limited, Sutton (GB)

( * ) Notice: Subject to any disclaimer, the term of this patent is extended or adjusted under 35 U.S.C. 154(b) by 69 days.

(21) Appl. No.: 15/039,398

(22) PCT Filed: Nov. 28, 2014

(86) PCT No.: PCT/GB2014/053535
§ 371 (c)(1),
(2) Date: May 25, 2016

(87) PCT Pub. No.: WO2015/079249
PCT Pub. Date: Jun. 4, 2015

(65) Prior Publication Data
US 2017/0045178 A1 Feb. 16, 2017

(30) Foreign Application Priority Data
Nov. 28, 2013 (GB) .................................. 1321034.9

(51) Int. Cl.
*F16L 58/10* (2006.01)
*F16L 59/20* (2006.01)
(Continued)

(52) U.S. Cl.
CPC ...... *F16L 58/1054* (2013.01); *B29C 63/0069* (2013.01); *B29C 63/22* (2013.01);
(Continued)

(58) Field of Classification Search
CPC ... F16L 58/1081; F16L 59/20; F16L 13/0272; F16L 58/1054; B29C 66/12821;
(Continued)

(56) References Cited

U.S. PATENT DOCUMENTS 3,865,662 A * 2/1975 Segal ...................... B29C 65/18
138/99
4,134,529 A * 1/1979 Hara .................... B23K 9/0282
156/158
(Continued)

FOREIGN PATENT DOCUMENTS

EP 1 016 514 7/2000
WO WO 93/24782 12/1993
(Continued)

*Primary Examiner* — Vishal I Patel
(74) *Attorney, Agent, or Firm* — Levy & Grandinetti

(57) ABSTRACT

A method of coating a field joint of a pipeline places at least one body having a thermoplastics material around the field joint. The body is heated in a mold cavity around the field joint to effect thermal expansion of the thermoplastics material. Thermal expansion of the body in the mold cavity is constrained to apply elevated pressure between the body and pipe sections joined at the field joint. The elevated pressure improves bonding and fusing between the body, which forms a field joint coating, and the parent coatings and the exposed pipe sections of the pipe joints. The body need not be fully molten, which reduces the mold residence time including in-mold heating and cooling phases.

10 Claims, 4 Drawing Sheets

(51) Int. Cl.
*F16L 13/02* (2006.01)
*B29C 63/00* (2006.01)
*B29C 63/22* (2006.01)
*B29C 65/00* (2006.01)
*B29K 701/12* (2006.01)
*B29L 23/00* (2006.01)

(52) U.S. Cl.
CPC ....... *F16L 13/0272* (2013.01); *F16L 58/1081* (2013.01); *F16L 59/20* (2013.01); *B29C 66/1286* (2013.01); *B29C 66/12821* (2013.01); *B29C 66/532* (2013.01); *B29C 66/71* (2013.01); *B29C 66/72321* (2013.01); *B29C 66/7392* (2013.01); *B29C 66/8264* (2013.01); *B29K 2701/12* (2013.01); *B29K 2905/12* (2013.01); *B29L 2023/225* (2013.01)

(58) Field of Classification Search
CPC ... B29C 66/1286; B29C 66/532; B29C 66/71; B29C 66/72321; B29C 66/7392; B29C 66/8264; B29C 63/0069; B29C 63/22; B29K 2023/12; B29K 2701/12; B29K 2905/12; B29L 2023/225
See application file for complete search history.

(56) References Cited

U.S. PATENT DOCUMENTS

| | | | |
|---|---|---|---|
| 4,428,789 A * | 1/1984 | Masaaki | B29C 63/16 138/110 |
| 4,514,241 A * | 4/1985 | Maukola | F16L 59/16 138/155 |
| 5,071,672 A | 12/1991 | Carlson, Jr. et al. | |
| 6,264,871 B1 | 7/2001 | Mullen et al. | |
| 6,406,063 B1 * | 6/2002 | Pfeiffer | B29C 65/342 285/21.2 |
| 7,407,197 B2 | 8/2008 | Gronquist | |
| 8,631,829 B1 * | 1/2014 | Bennett | B29C 66/8284 138/104 |
| 2012/0031878 A1 * | 2/2012 | Rukavina Mikusic | B29C 63/42 219/59.1 |

FOREIGN PATENT DOCUMENTS

| | | |
|---|---|---|
| WO | WO 02/11972 | 2/2002 |
| WO | WO 02/053343 | 7/2002 |
| WO | WO 2004/067897 | 8/2004 |
| WO | WO 2007/037964 | 4/2007 |
| WO | WO2008/071773 | 6/2008 |
| WO | WO 2011/033176 | 3/2011 |
| WO | WO 2011/150520 | 12/2011 |
| WO | WO 2012/004665 | 1/2012 |
| WO | WO 2012/023841 | 2/2012 |
| WO | WO 2012/168149 | 12/2012 |
| WO | WO 2012/172451 | 12/2012 |
| WO | WO 2013/070074 | 5/2013 |

* cited by examiner

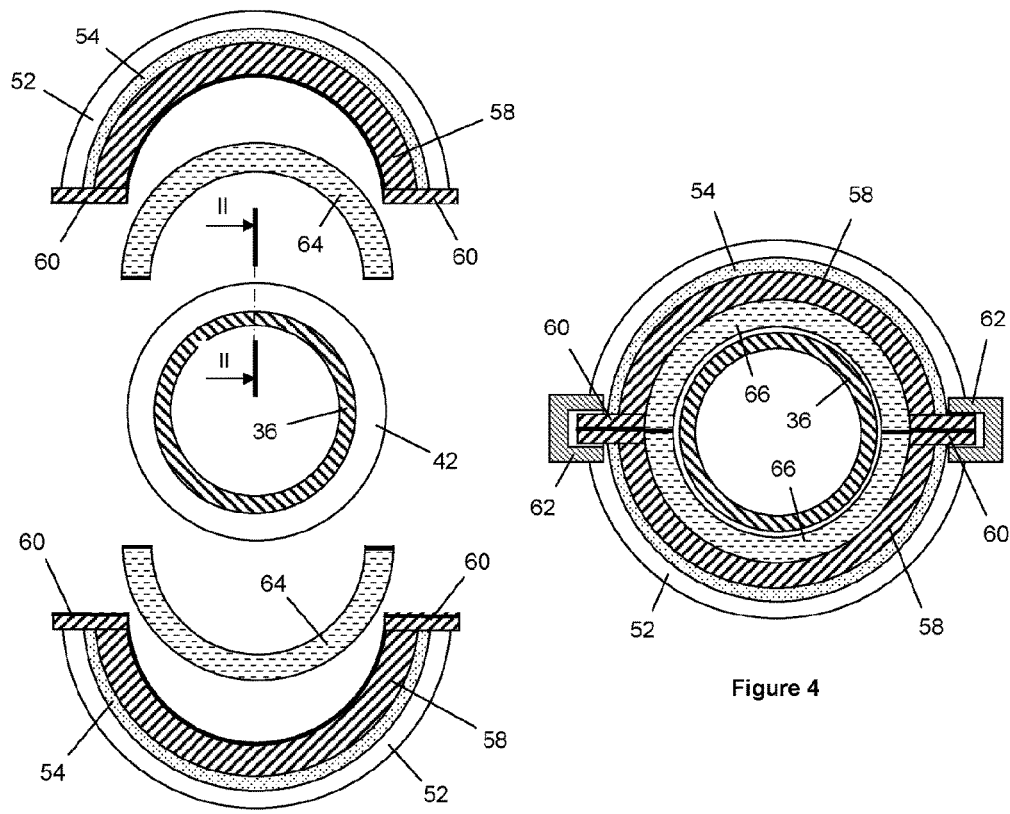
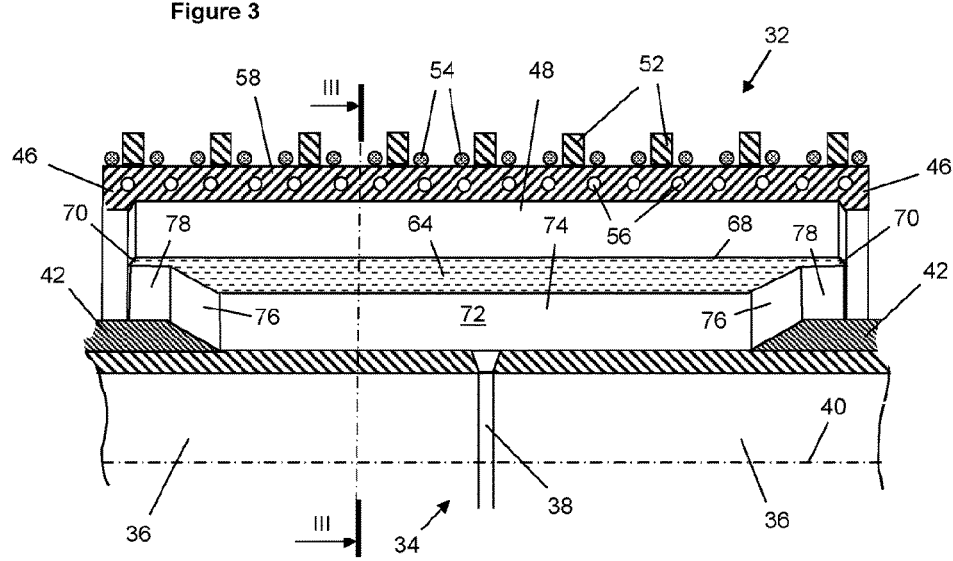
Figure 3
Figure 4
Figure 5

METHOD OF AND SYSTEM FOR COATING A FIELD JOINT OF A PIPE

This invention relates to coating pipes, in particular to apparatus and techniques for coating pipeline field joints and to pipelines having field joints coated by those techniques.

Pipelines used in the oil and gas industry are usually formed of lengths of steel pipe—'pipe joints'—that are welded together end-to-end before the pipeline is laid. To mitigate corrosion of the pipeline and optionally also to insulate the fluids that the pipeline carries in use, the pipe joints are pre-coated with protective parent coatings that, optionally, are also thermally insulating.

Many variations are possible in the structure and composition of the parent coating to obtain the required protective or insulative properties. However, polypropylene (PP) is most commonly used to coat the pipe joints from which pipelines are made. The PP is typically applied onto an anti-corrosion base layer on the steel of a pipe joint, such as a fusion-bonded epoxy (FBE) coating.

A three-layer PP (3LPP) parent coating may be used for corrosion protection. Additional layers may be used if greater thermal insulation is needed, such as in a 5LPP or 7LPP coating. The terms '3LPP', '5LPP' and '7LPP' will be readily understood by persons skilled in the art.

A short length of pipe is left uncoated at each end of the pipe joint to facilitate welding. The resulting 'field joint' must be coated with a field joint coating to mitigate corrosion and to maintain whatever degree of insulation may be necessary for the purposes of the pipeline.

Where a pipeline is laid offshore, welding and field joint coating is commonly performed aboard a pipelaying vessel such as a laybarge that fabricates and launches the resulting pipe string using S-lay or J-lay methods. Welding and field joint coating may also be performed onshore at a spoolbase, where pipe joints are firstly joined to form long pipe stalks and the pipe stalks are later joined successively end-to-end to form a continuous pipe for spooling onto a visiting reel-lay vessel.

High-quality field joint coatings are important to ensure effective protection and insulation throughout the long design life of a subsea pipeline. It is also important that field joint coating operations can be completed quickly enough that they do not adversely delay the chosen fabrication process. This is a particular concern in an S-lay operation, where stepwise parallel processing in successive work stations allows the highest fabrication rate to minimise tie-up of a valuable pipelaying vessel. However, it is emphasised that the invention is not limited to S-lay operations or to use on a pipelaying vessel: the invention may instead be employed in J-lay operations or at an on-shore spoolbase supporting reel-lay operations.

By way of background, U.S. Pat. No. 5,071,672 and WO 2011/033176 disclose field joint coating apparatus in which a rotary yoke or carriage turns around a pipe to apply a coating to an external surface of the pipe. In similar manner, EP 1016514 and WO 2002/011972 disclose wrapping a pre-prepared sheet or tape of coating material around the pipe. Also, WO 2008/071773 and WO 2012/172451 disclose how a sheet of coating material may be extruded from an extruder that itself turns around the pipe while a pressing roller compacts the sheet once applied.

In contrast, the present invention is concerned with a moulding process in which a polymer solidifies in a tubular mould around a field joint. Rotary applicators such as those outlined above are irrelevant to moulding, as the layer of coating material is continuously applied as a sheet or as liquid or powder from a dispenser. Rotary applicators are bulky, complex and slow, and are not apt to produce field joint coatings that satisfy the requirements of the invention.

WO 2012/004665 explains that a cast-moulded polyurethane (CMPU) process may be used to produce field joint coatings. In a CMPU process, a two-part urethane resin poured into a mould around a field joint cross-links to form polyurethane (PU). However, WO 2012/004665 goes on to explain that CMPU field joint coatings suffer from the chemical dissimilarity between PP (a thermoplastic polymer) and PU (a thermoset polymer), which undermines the bond strength between the parent coating and the field joint coating. This introduces a risk that cracks may occur at the interface between the parent coating and the field joint coating.

As WO 2012/004665 acknowledges, the disadvantages of a CMPU field joint coating may be mitigated by instead using PP as a field joint coating. Specifically, a field joint coating of PP may be made by an injection-moulded polypropylene (IMPP) process.

In an IMPP process, the field joint is enclosed by a mould that defines an annular mould cavity around the field joint. Molten PP is injected into the cavity under high pressure. PP is a thermoplastic material and therefore sets by cooling during and after injection. Once the PP has cooled to a self-supporting extent, the mould is removed, leaving a tube of PP around the field joint that serves as the field joint coating.

Advantageously, the resulting PP field joint coating has similar mechanical and chemical properties to the adjoining PP parent coating. Also, the compatible thermoplastics materials of the parent coating and the field joint coating fuse together at their mutual interface, resisting cracking and hence giving longer service life. The service temperature of PP is also markedly higher than PU.

Whilst a PP field joint coating is desirable for the above reasons, the IMPP process presents considerable challenges in the context of fabricating subsea pipelines. For example, IMPP coating suffers from the viscosity of the molten PP and hence the need to pump and contain the PP at high moulding pressures. This adds to the bulk, complexity and cost of the mould and of the injection equipment that feeds molten PP to the mould. Increased bulk is a particular disadvantage where space is restricted, as for example on a vessel at sea. Melting and then injecting the PP also adds time to the process.

In general, heating is used in the art of field joint coating to melt a sheet or to shrink a sheet. It is also known in the art of field joint coating for a mould, sleeve or collar encircling a pipe to include electrical heating wires. Typically, the heating wires are located only where sealing or fusing has to be achieved, namely at the interface with the parent coating and at seams of the mould, sleeve or collar.

For example, WO 2007/037964 teaches the use of a plastics sheet to form a mould for an insulating infill. The sheet is sealed or fused by electrical heating, using electrical heating elements that are localised at key interfaces. The insulating infill is a thermoset polymer such as PU. Of course, if the infill were a hot molten thermoplastic instead, it would threaten the integrity of a mould that relies on heating and fusing for its construction.

Another approach to heating in the art of field joint coating is described in WO 02/053343. Here, an induction heating coil heats a zone to be patched for repair, before applying a patch of heat-shrinkable sleeve material. The technique taught by WO 02/053343 may be suitable for fabricating a basic field joint coating. However, it is not suitable for polymer moulding, which is necessary quickly to create a layer that is thick enough to provide effective thermal insulation.

WO 2012/168149 relates to a field joint coating material based on a fast curable olefin liquid formulation and to a process of making a field joint for pipelines for use especially in a sub-sea environment and, more specifically, to a method of forming a field joint for pipelines which facilitates smooth reeling and laying of the pipelines. The olefin liquid is a thermoset which is pre-heated prior to injection into a mould cavity in order to form the joint coating.

WO 2012/023841 describes a method of protecting field joints of an offshore coated pipeline during laying of the pipeline, the method comprising the steps of installing a cover sheet around the pipeline field joint so as to bridge weight coating portions to either side of the joint, thereby forming a cavity between the sheet and the joint. A thermoset polyurethane foam is injected into the cavity through an opening. The foam solidifies and forms the joint coating.

WO 2011/150520 describes a pipe coating material having an inner layer of epoxy resin and an outer layer formed from a thermoplastic such as polyethylene or polypropylene. The coating is pre-heated before being injected into a mould cavity around the joint and then allowed to cool when inside the mould cavity. No additional heat is applied once inside the mould.

WO 2004/067897 describes a method and apparatus for filling pipeline joints. The pipe joint is covered with a mesh material and a mould structure. One embodiment describes placing plastic "half shells" around the pipe ends to be joined prior to application of the mesh and the mould structure. A filler material may then be injected into the mould to populate the volume around the half shells inside the mould. The filler material is a thermoset, namely polyurethane, and so no heating is done once the filler material is inside the mould since this would degrade the thermoset.

WO 93/24782 describes a method of protecting a welded joint between two weight-coated metal pipelines. The method comprises positioning a wraparound sheet steel mould around the joint, retaining that mould around the joint using a wraparound heat shrinkable fabric sleeve with high tear strength, and filling the mould with corrosion resistant mastic. The mastic is described as marine asphalt. The mastic is heated to maintain it in liquid form for injecting into the steel sleeve mould. Once in the mould, heating ceases whilst the mastic solidifies.

U.S. Pat. No. 7,407,197 describes an apparatus and method of coating pipe joints. A heat shrinkable sleeve is placed around the joint and polyurethane foam is pre-heated to liquid form and then injected into a cavity formed between the sleeve and the pipe joint. Heating ceases once the foam is in the cavity so that the foam can solidify by chemical curing.

U.S. Pat. No. 6,264,871 again describes an apparatus and method of coating pipe joints. A mould is provided and again, polyurethane foam is pre-heated to liquid form and then injected into the mould cavity. Heating ceases once the foam is in the cavity so that the foam can solidify.

It is against this background that the present invention has been devised.

In one expression of the inventive concept, the invention resides in a method of coating a field joint of a pipeline. That method comprises: placing at least one body comprising a thermoplastics material around the field joint; heating the body in a mould cavity around the field joint to effect thermal expansion of the thermoplastics material; and constraining thermal expansion of the body in the mould cavity to apply elevated pressure between the body and pipe sections joined at the field joint. After elevated pressure has been held between the body and the pipe sections, the body may be cooled in the mould cavity to form a field joint coating.

The method of the invention improves bonding and fusing between the body, which forms a field joint coating, and the parent coatings and the exposed pipe sections of the pipe joints. Yet, it is not essential that the body is fully molten, which greatly reduces the mould residence time including in-mould heating and cooling phases.

Interface surfaces of the body may be heated to soften them even if the internal bulk of the body remains cool enough to be solid. Thus, the method of the invention suitably comprises pre-heating the body to a temperature below a melting point of the thermoplastics material, although it is possible to pre-heat an external surface of the body to a higher temperature than an internal bulk of the body and possibly to a softening or melting temperature while the internal bulk remains solid.

To promote bonding and fusing where required while minimising addition of heat to the system, it is possible selectively to pre-heat a side of the body that will be inward to a higher temperature than a side of the body that will be outward.

The body is suitably pre-heated before placing the body around the field joint. For ease of handling, the thermoplastics material of the body is preferably of self-supporting solidity before the body is placed around the field joint.

The body may be placed around the field joint by assembling two or more body elements around the field joint. Similarly, two or more mould tool elements may be assembled around the field joint to make a mould tool that defines the mould cavity, suitably after the body has been placed around the field joint.

If one or more of the body elements are attached to each mould tool element, two or more body elements may be assembled around the field joint by assembling two or more mould tool elements around the field joint to make a mould tool that defines the mould cavity.

If the mould cavity has a first volume, then on being placed around the field joint, the body suitably has a second volume selected such that the body can fit into the mould cavity. In that case, the thermoplastics material of the body has a coefficient of thermal expansion such that, when heated in the mould cavity, the body would expand to a volume greater than the first volume if such thermal expansion were not constrained.

Thus, the inventive concept also finds expression in a system for coating a field joint of a pipeline. The system of the inventions comprises: a mould tool that may be positioned around the field joint to define a mould cavity of a first volume; a body comprising a thermoplastics material, the body being arranged to fit into the mould cavity and having a second volume selected such that the body can fit into the mould cavity; and a heating system for heating the body in the mould cavity to effect thermal expansion of the thermoplastics material. The thermoplastics material has a coefficient of thermal expansion such that, when heated in the mould cavity to temperature at which interface surfaces of the body are capable of fusing or bonding with the parent coatings and the exposed pipe sections of the pipe joints, the body would expand to a third volume greater than the first volume if such thermal expansion were not constrained by the mould tool.

The thermoplastics material of the body is preferably a self-supporting block. The body may comprise a core structure embedded in the thermoplastics material, which core structure may be made of a material with a higher melting point than that of the thermoplastics material.

Closely to match the contours of the field joint region, the body advantageously comprises, in longitudinally-outward succession from a longitudinal centre: a relatively thick central portion and ramp surfaces leading to relatively thin end portions. The relatively thin end portions suitably correspond to longitudinal extensions of the mould cavity, which extensions are positioned to overlap parent coatings of pipe sections joined end-to-end at the field joint.

The inventive concept extends to a pipeline production facility performing the method of the invention or comprising the system of the invention. The inventive concept also embraces a pipeline or a field joint for a pipeline, produced by performing the method of the invention, by the system of the invention or by the pipeline production facility of the invention.

In order that the invention may be more readily understood, reference will now be made, by way of example, to the accompanying drawings in which:

FIG. 3 is an exploded schematic sectional view of apparatus in accordance with the invention, taken on line III-III of FIG. 5, showing the apparatus in conjunction with pipe joints requiring a field joint coating;

Figure 2:
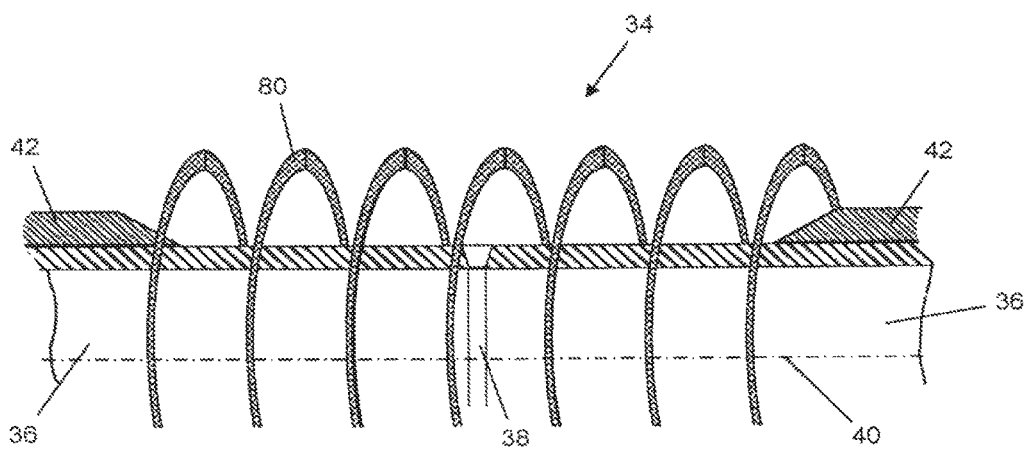
FIG. 2 is a schematic longitudinal sectional view through adjoining pipe joints taken on line II-II of FIG. 3, showing part of a field joint surrounded by an induction coil to be heated before coating.
Figure 6:
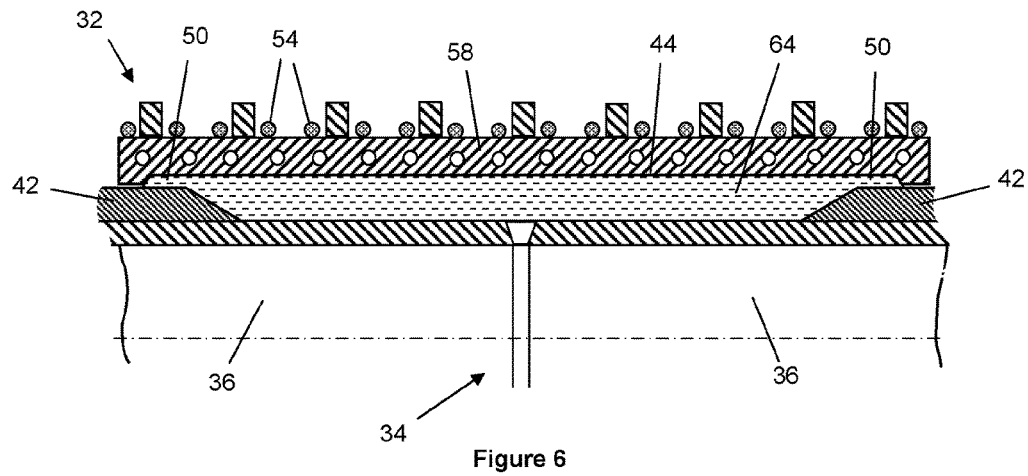
Figure 7:
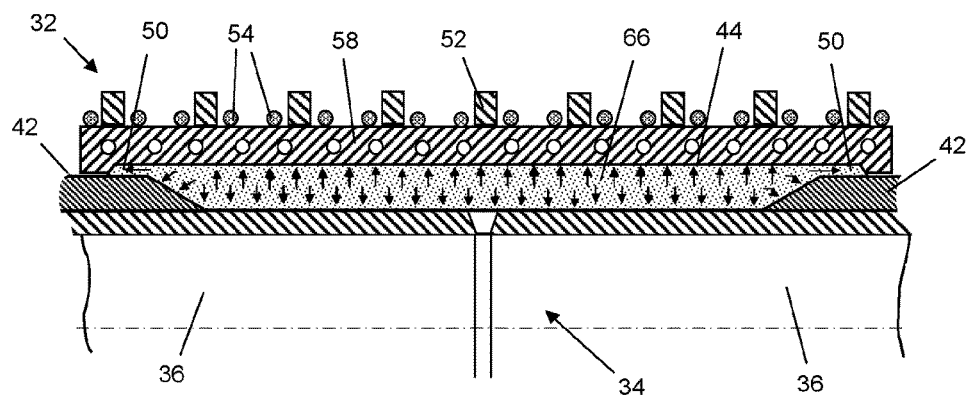
Figure 8:
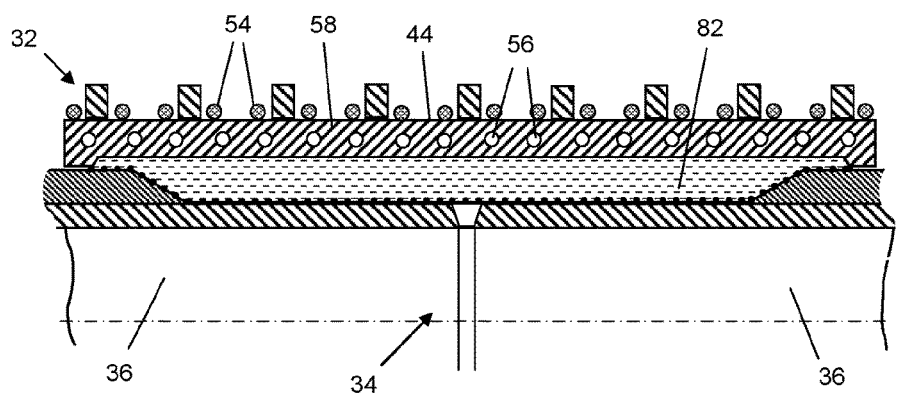
Figure 9:
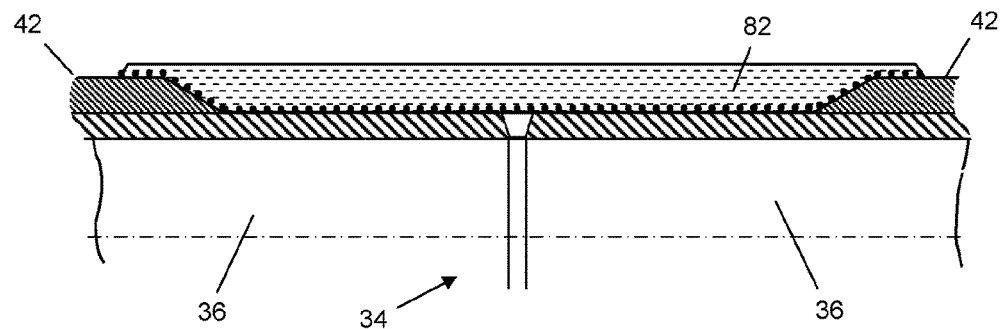
Figure 10:
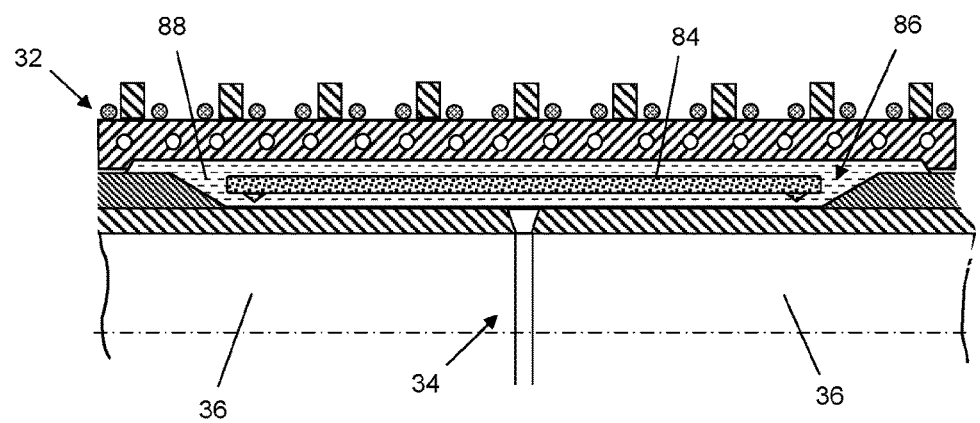
Figure 11:
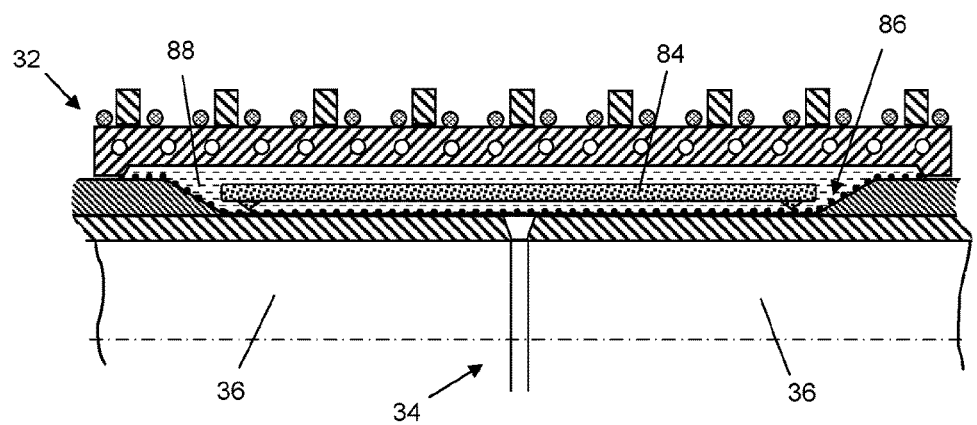

FIG. 4 corresponds to FIG. 3 but shows a mould tool of the apparatus assembled around the pipe joints and a thermoplastics body positioned in a mould cavity between the mould tool and the pipe joints;

FIG. 5 corresponds to FIG. 2 but shows the induction coil removed and the mould tool and thermoplastics body of FIGS. 3 and 4 being assembled around the heated field joint;

FIG. 6 corresponds to FIG. 5 but shows the mould tool and thermoplastics body now assembled around the field joint and ready for a moulding operation to begin;

FIG. 7 corresponds to FIG. 6 but shows the moulding operation in progress, with the thermoplastics body heated by the mould tool to expand and conform to the mould cavity so as to form a field joint coating around the adjoining pipe joints;

FIG. 8 corresponds to FIG. 7 but shows the moulding operation nearing completion, with the field joint coating cooling in the mould cavity;

FIG. 9 corresponds to FIG. 8 but shows the moulding operation now complete, with the mould tool removed to allow the field joint coating to be cooled further by exposure to air or a cooling liquid;

FIG. 10 corresponds to FIG. 6 but shows a variant in which a core structure is embedded in an overmoulded thermoplastics body; and FIG. 11 corresponds to FIG. 8 but shows the core structure of the variant shown in FIG. 10.

Figure 1:
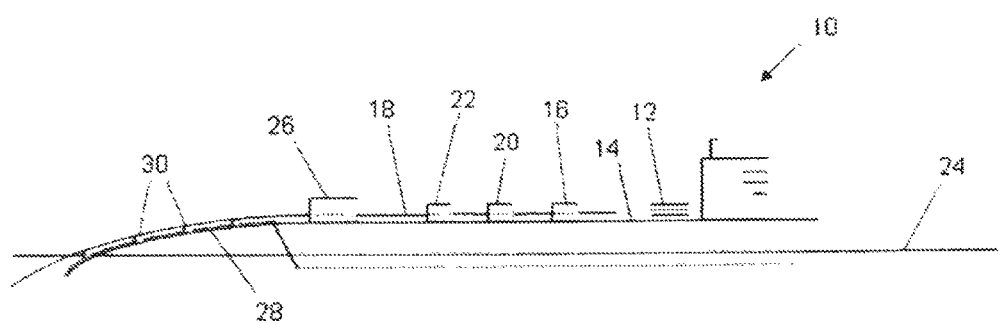
FIG. 1 is a schematic side view of a lay barge configured for S-lay operations, showing a typical context for the coating techniques of the present invention.

Referring firstly to the schematic view of FIG. 1 of the drawings, a pipelaying vessel 10 is configured for the S-lay installation method and moves from left to right as illustrated during a pipelaying operation. The vessel 10 carries a supply of pipe joints 12 on its deck 14 that are welded together at one or more welding stations 16 to form a pipe string 18 that moves aft with respect to the vessel 10 along a firing line. The welds are tested at one or more testing stations 20 located downstream (i.e. aft) of the welding stations 16 and are then coated at one or more coating stations 22 located downstream of the testing stations 20. The welding stations 16, testing stations 20 and coating stations 22 thus lie on the firing line along which the pipe string 18 moves as it is assembled, checked and coated before being launched from the vessel 10 into the sea 24.

The pipe string 18 is supported by a tensioner system 26 located downstream of the coating stations 22. The tensioner system 26 typically comprises multiple tensioners but such details are not relevant to the invention and so have been omitted from the drawings.

The pipe string 18 is launched from the vessel 10 over a stinger 28 extending aft of the vessel 10, located downstream of the tensioner system 26. The stinger 28 comprises rollers 30 that support the overbend of the pipe string 18 as it enters the sea 24.

In this example, the pipe string 18 hangs from the stinger 28 in a shallow S-shape under tension acting between the tensioner system 26 and a touchdown point on the sea bed (not shown). It is possible for a pipe string to experience a much greater deflection through the overbend than is shown in FIG. 1, especially in so-called Steep S-lay operations in which the departure angle of the pipe string is close to vertical as it leaves the stinger.

The present invention is concerned with field-joint coating operations that may be performed at the coating stations 22 on the firing line of the vessel 10. Those coating operations will now be described with reference to FIGS. 2 to 9 of the drawings. Again, however, it is emphasised that the invention is not limited to S-lay operations or to use on a pipelaying vessel.

FIGS. 3 to 8 show a mould tool 32 in accordance with the invention, either encircling or about to encircle a welded field joint 34 of a pipeline at a coating station 22. Conversely, FIGS. 2 and 9 show the field joint 34 without the mould tool 32. Specifically, FIG. 2 shows the field joint 34 before the mould tool 32 has been assembled around the field joint 34 to produce a field joint coating, whereas FIG. 9 shows the field joint after the mould tool 32 has been removed from the field joint 34 to leave behind the field joint coating.

The longitudinal sectional views of FIGS. 2 and 5 to 9 show that the field joint 34 is created between abutting pipe joints 36 where a circumferential butt weld 38 attaches the pipe joints 36 to each other. The pipe joints 36 are aligned end-to-end on a common central longitudinal axis 40.

FIGS. 2 and 5 to 9 also show that each pipe joint 36 is coated with a parent coating, for example a 5LPP coating 42, and that the parent coating 42 terminates short of the end of each pipe joint 36 with a typically chamfered end shape. An annular gap lies between the opposed chamfered ends of the parent coatings 42 around the weld 38, where the exposed external surfaces of the pipe joints 36 need to be coated with a field joint coating.

References in this description to the exposed external surfaces of the pipe joints 36 do not imply that those surfaces are of bare metal and so necessarily lack any coating at all. Instead, at these locations, the external surfaces of the pipe joints 36 lack a full-thickness parent coating: they could have a thin coating or layer, for example an anti-corrosion layer of FBE or a layer of polymer or adhesive to promote adhesion of a field joint coating. Thus, there may be at least one layer of plastics or composite material on the steel of the pipe joints 36 before a moulding operation. The role of such layers can be anti-corrosion, to treat the steel surface of the pipe joints 36 and/or to improve bonding of the field joint coating material.

For the purpose of forming a field joint coating, the mould tool 32 is fixed around the field joint 34 as FIGS. 3 to 8 show. The mould tool 32 extends from one parent coating 42 to the other and overlaps both parent coatings 42. Once attached in this position, the mould tool 32 defines a mould cavity 44 that includes the annular gap between the chamfered ends of the parent coatings 42. The dimensions of the field joint 34 and particularly the length of the annular gap between the parent coatings 42 must be known and controlled as this determines the volume of the mould cavity 44.

Opposed end portions 46 of the tubular mould tool 32 seat against the parent coatings 42 of the respective pipe joints 36 and so have an internal diameter corresponding to the external diameter of the coated pipe joints 36. A central portion 48 of the mould tool 32 disposed between the end portions 46 and encompassing the gap between the parent coatings 42 has an increased internal diameter that exceeds the external diameter of the coated pipe joints 36. This enlarged central portion 48 extends beyond the chamfered ends of the parent coatings 42 to define extensions 50 of the mould cavity 44.

Other features of the mould tool 32 evident in FIGS. 5 to 8 are: circumferential external hoop-like stiffening ribs 52; circumferential external heating elements 54 such as electrical heating wires that are in thermal contact with the mould tool 32; and an array of cooling pipes 56 embedded in the tubular wall of the mould tool 32 that constitute a cooling water jacket. Other cooling fluids such as oil or a gas could be pumped through the cooling pipes 56 instead of water. It is also possible for a hot fluid to be pumped through the cooling pipes 56 so as to heat up the mould tool 32 before use.

Ancillary features of the mould tool 32 such as vents for expelled air will be well known to those skilled in the art of polymer moulding and so have been omitted from the drawings for clarity. Ideally a vacuum pump would be coupled to such air vents to evacuate the mould cavity 44. Also, as is well known in the art, inner surfaces of the mould tool 32 facing the mould cavity 44 may be treated with a non-stick treatment such as a PTFE coating or may have release agents applied to them to discourage adhesion between the mould tool 32 and the field joint coating.

As can be appreciated in the transverse sectional views of FIGS. 3 and 4, the mould tool 32 comprises a tube of generally circular cross-section, divided longitudinally on a diameter of the cross-section into two hollow half-shells 58 of semi-circular cross-section. The half-shells 58 are assembled together to encircle the pipe joints 36 around the field joint 34.

The half-shells 58 have opposed flanges 60 that are clamped together where they meet by external clamps 62 represented schematically in FIG. 4. The clamps 62 hold together the two half-shells 58 against internal pressure within the mould cavity 44 of the mould tool 32 in use; their clamping pressure also holds the two half-shells 58 in contact with the parent coatings 42 of the pipe joints 36.

FIGS. 3 and 4 also show inserts 64, which are injection-moulded blocks of thermoplastics such as PP. The inserts 64 are hollow part-tubular shells, in this example half-shells of semi-circular cross-section, that come together around the field joint 34 to form a tubular thermoplastics body 66 of circular cross-section. That tubular thermoplastics body 66 lies in the mould cavity 44 between the mould tool 32 and the pipe joints 36 when the mould tool 32 is assembled as shown in FIG. 4.

Each insert 64 has an external radius of curvature that substantially matches the internal radius of curvature of the central portion 48 of the mould tool 32. Each insert 64 also has an internal radius of curvature that substantially matches the external radius of curvature of the exposed pipe joints 36.

There is some tolerance for the internal radius of curvature of each insert 64 to be either slightly greater or slightly less than the external radius of curvature of the uncoated pipe joints 36. The former case—oversized inserts 64—allows the inserts 64 to fit readily around the uncoated pipe joints 36 when the mould tool 32 and the thermoplastics body 66 are assembled. The latter case—undersized inserts 66—may involve the inserts 64 undergoing slight elastic deformation upon being force-fitted around the uncoated pipe joints 36.

As FIG. 5 makes clear, each insert 64 has a convex outer wall 68 that is smooth and cylindrical apart from chamfered end edges 70 corresponding to matching chamfers at opposed ends of the mould cavity 44. Each insert 64 also has a concave longitudinally-stepped inner wall 72 comprising, in longitudinally-outward succession from the centre:

a thickened central portion 74 whose thickness substantially matches the depth of the mould cavity 44 measured in a radial direction with respect to a central longitudinal axis 40;

frusto-conical ramps 76 matching the chamfered ends of the parent coatings 42; and thin end portions 78 corresponding to the extensions 50 at opposed ends of the mould cavity 44.

Whilst the inserts 64 that make up the thermoplastics body 66 are shown separately from the half-shells 58 of the mould tool 32 in the exploded views of FIGS. 3 and 5, it is possible for the inserts 64 instead to be attached to the half-shells 58 for ease of handling before assembly. In that case, the inserts 64 can be brought together to make up the tubular thermoplastics body 66 simply by bringing together the half-shells 58 of the mould tool 32, to which the inserts 64 are attached.

FIG. 2 shows the preliminary step of heating the region of the field joint 34 with an inductive heating coil 80. Gas burners may be used instead or in addition to heat both the pipe joints 36 and the parent coatings 42 around the field joint 34.

The half-shells 58 of the mould tool 32 are suitably pre-heated by pumping warm fluid through the cooling pipes 56 or by activating the heating elements 54 at low power.

The inserts 64 are also suitably pre-heated: for example, they may be pre-heated in an oven, by gas burners or by thermal conduction from the pre-heated half-shells 58 of the mould tool 32.

The inserts 64 should only be pre-heated to a temperature below the melting point of their constituent thermoplastics material, as they need to be of self-supporting solidity for handling and assembly. However, external surfaces of the inserts 64 could be heated to a higher temperature than the internal bulk of those inserts 64. Preferably at least the inner wall 72 is heated selectively to a higher temperature than the outer wall 68 of an insert 64.

In this way, the internal bulk of an insert 64 may be substantially solid to support the insert 64 and relatively cool to accelerate cooling once a field joint coating has been formed. In contrast, external surfaces of an insert 64 may be hotter than the internal bulk to promote fusing with adjoining coating surfaces in and around the mould cavity 44 during the moulding operation. In one example, external surfaces of the insert 64 could be softened close to their melting point, for instance to the tacky consistency of a viscous fluid.

Pre-heating external surfaces of an insert 64 in this way will promote fusing with similarly-heated abutting fusible surfaces bounding the mould cavity 44. It will also promote fusing with external surfaces of adjoining inserts 64 also positioned in the mould cavity 44. At least, such pre-heating will accelerate the heating phase of the moulding process by allowing these interface surfaces of the inserts 64 quickly to reach a temperature at which fusing with adjoining interface surfaces in and around the mould cavity 44 can occur.

FIG. 5 shows the heating coil 80 removed when the region of the field joint 34 is hot enough. Now, one of the half-shells 58 of the mould tool 32 and one of the inserts 64 of the thermoplastics body 66 are being assembled around the heated field joint 34.

FIG. 6 shows one of the half-shells 58 of the mould tool 32 and one of the inserts 64 of the thermoplastics body 66 now assembled and clamped around the field joint 34, ready for a moulding operation to begin.

In FIG. 7, the moulding operation is in progress, with the thermoplastics body 66 being heated by the mould tool 32. Thus, the heating elements 54 are now active at high power to heat the thermoplastics body 66 by thermal conduction through the tubular wall of the mould tool 32. In response to being heated in this way, the inserts 64 expand and fuse into a single thermoplastics body 66, which expands to fill and conform to the mould cavity 44 so as to form a field joint coating moulded around the adjoining pipe joints 36.

The initial volume of the thermoplastics body 66, when still solid, is almost the same as—but by virtue of clearances around the thermoplastics body 68, slightly less than—the volume of the mould cavity 44. However, the initial volume of the thermoplastics body 66 is chosen such that, when heated to fusing temperature, its volume exceeds the volume of the mould cavity 44, having regard to the coefficient of thermal expansion of its constituent thermoplastics material.

The mould tool 32 constrains the thermal expansion of the thermoplastics body 66 as the stiffening ribs 52 resist outward deflection of the tubular wall of the mould tool 32. Consequently, the mould tool 32 effectively confines and resists thermal expansion of the thermoplastics body 66, imparting inward pressure as a reaction to the outward expansion pressure.

As a result of thermal expansion, increasing inward pressure of the thermoplastics body 66 against the mould tool 32 effects intimate contact between, and promotes bonding or fusing of, the inner wall 72 of the thermoplastics body 66 and the exposed surfaces of the pipe joints 36, the chamfered ends of the parent coatings 42, and the outer surfaces of the parent coatings 42 in the extensions 50 of the mould cavity 44. Bonding or fusing with the thermoplastics body 66 is aided by the high temperatures at those interfaces.

Turning next to FIG. 8, this shows the moulding operation nearing completion. The heating elements 54 have been switched off and water or other cooling fluid has been passed through the cooling pipes 56 to draw heat from the thermoplastics body 66 into the tubular wall of the mould tool 32. As a result, as shown schematically by dotted lines, the inner wall 72 of the thermoplastics body 66 has now solidified and fused with the exposed surfaces of the pipe joints 36, the chamfered ends of the parent coatings 42, and the outer surfaces of the parent coatings 42. The result is a tubular field joint coating 82 that fits tightly around the previously-exposed outer surfaces of the pipe joints 36 and that fills the annular gap between the chamfered ends of the parent coatings 42.

When the operation parameters have been checked and the field joint coating 82 in the mould cavity 44 has cooled and solidified to an appropriately self-supporting extent, the two half-shells 58 of the mould tool 32 are unclamped and separated from the field joint 34 in a demoulding operation. Thus, FIG. 9 corresponds to FIG. 8 but shows the moulding operation now complete, with the mould tool 32 removed to allow the field joint coating 82 to be air-cooled to ambient temperature by exposure to ambient air.

If faster cooling is required, air or other cooling gases may be blown over the exposed field joint coating 82 to cool it by conduction and convection. Alternatively, or additionally, a cooling liquid such as water may be sprayed or poured over the exposed field joint coating 82, to cool it by conduction and evaporation. The temperature and/or the flow rate of cooling liquids or gases may be modified to control the rate of cooling; for example, such liquids or gases may be refrigerated to below ambient temperature.

By virtue of the extensions 50 at the ends of the mould cavity 44, the ends of the field joint coating 82 overlap the parent coatings 42 slightly. Those overlaps lengthen and hence beneficially increase the area of the interfaces between the parent coatings 42 and the field joint coating 82.

Many variations are possible within the inventive concept. For instance, the inserts that make up the thermoplastics body need not be of the same material or construction throughout their thickness. It would be possible, for example, to embed a core structure within the thermoplastics material of the inserts in an overmoulding process to improve the insulation or structural integrity of the eventual field joint coating. If its material has a melting temperature that is high enough, a core structure may remain substantially solid even if the surrounding thermoplastics material of the inserts softens with increasing temperature.

A core structure 84 is shown in a variant of the insert 86 in FIGS. 10 and 11 of the drawings. Like the corresponding FIGS. 6 and 8, these drawings show the insert 86 before and then after the thermoplastics material 88 surrounding the core structure 86 has been fused with the exposed surfaces of the pipe joints 36, the chamfered ends of the parent coatings 42, and the outer surfaces of the parent coatings 42.

Where the inserts 64, 86 are attached to the half-shells 58 to ease handling, the inserts 64, 86 may, for example, be attached by adhesive to the half-shells 58. Any such adhesive should be weak or should break down under moulding conditions so as not to hinder eventual demoulding. Alternatively it would be possible to use a moulding tail for handling purposes, which is cut after the field joint coating is completed. Another approach is to use temporary tails or pins, which could be moulded to ease handling operations and could be trimmed after the field joint coating is completed.

An advantage of the preferred embodiments described above is that the thermoplastics body 66 need not be melted fully and so is quicker both to heat and to cool in the mould cavity 44. However, it would be possible for the thermoplastics body 66 to be more substantially molten when in the mould cavity 44, in which case end seals may be provided to maintain pressure in the mould cavity 44 by preventing leakage of the molten thermoplastics. Such end seals may be located at the end portions 46 of the mould tool 32, extending circumferentially and facing inwardly toward the parent coatings 42 of the pipe joints 36.

In other variants, the heating elements could instead be embedded in the tubular wall of the mould tool or the cooling pipes could instead be external to the mould tool. Alternatively, the external heating elements and the cooling pipes could both be embedded in the tubular wall of the mould tool or could both be external to the mould tool.

Optionally, a mould tool cooling system may be supplemented by a pipe cooling device positioned inside the abutting pipe joints to cool the thermoplastics body 66 by accelerating conduction of heat through the walls of the pipe joints 36. Such a pipe cooling device may, for example, be a refrigerated pig or a spray head that is movable longitudinally along the pipe joints 36 to apply cooling where it is needed. An example of such a spray head is disclosed in WO 2012/004665.

The inserts or the thermoplastics body may take other forms or be constructed differently or of different materials. For example, they may be or comprise a rigid or pliant solid; a relatively solid core with one or more softer outer layers; a viscous paste shaped as a half-shell or other desired shape; a relatively rigid envelope around a softer core; or a different thermoplastics material with different properties and different softening or melting temperature.

For example, the thermoplastics material used for the inserts or the thermoplastics body may be PP, polystyrene or other suitable thermoplastics material that is compatible with the parent coating applied to the pipe joints and that has a suitable coefficient of thermal expansion. Additives or modifiers may be employed, such as an elastomeric modifier like EPDM (ethylene propylene diene monomer rubber) to provide appropriate flexibility and impact resistance, or fibres of glass, aramid or carbon to increase strength and elastic modulus. Additives such as fibres may also control shrinkage and accelerate cooling.

The invention claimed is:

1. A method of coating a field joint of a pipeline, the method comprising:
    placing at least one body comprising a thermoplastics material around the field joint;
    assembling two or more mould tool elements around the field joint to make a mould tool that defines a mould cavity;
    heating the body in the mould cavity around the field joint to effect thermal expansion of the thermoplastics material; and
    constraining thermal expansion of the body in the mould cavity to apply elevated pressure between the body and pipe sections joined at the field joint, and then removing the mould tool from around the field joint;
    wherein:
    the mould cavity has a first volume;
    on being placed around the field joint, the body has a second volume such that the body can fit into the mould cavity; and
    the thermoplastics material of the body has a positive coefficient of thermal expansion such that, when heated in the mould cavity, the body would expand from the second volume to a third volume greater than the first volume if such thermal expansion were not constrained.

2. The method of claim 1, comprising pre-heating the body to a temperature below a melting point of the thermoplastics material.

3. The method of claim 2, comprising pre-heating an external surface of the body to a higher temperature than an internal bulk of the body.

4. The method of claim 2, comprising pre-heating an inward side of the body to a higher temperature than an outward side of the body.

5. The method of claim 2, comprising pre-heating the body before placing the body around the field joint.

6. The method of claim 1, wherein the thermoplastics material of the body is of self-supporting solidity before the body is placed around the field joint.

7. The method of claim 1, comprising placing the body around the field joint by assembling two or more body elements around the field joint.

8. The method of claim 1, comprising assembling the mould tool elements around the body after the body has been placed around the field joint.

9. The method of claim 1, comprising assembling two or more body elements around the field joint by assembling two or more mould tool elements around the field joint to make a mould tool that defines the mould cavity, one or more of the body elements being attached to each mould tool element.

10. The method of claim 1, wherein after elevated pressure has been held between the body and the pipe sections, the body is cooled in the mould cavity.

* * * * *